United States Patent
Yu et al.

(10) Patent No.: US 10,256,934 B2
(45) Date of Patent: Apr. 9, 2019

(54) CHIRP MANAGED LASER GENERATION FOR NEXT GENERATION PASSIVE OPTICAL NETWORKS

(71) Applicant: ZTE Corporation, Shenzhen (CN)

(72) Inventors: Jianjun Yu, Basking Ridge, NJ (US); Hung-Chang Chien, Bridgewater, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/729,650

(22) Filed: Oct. 10, 2017

(65) Prior Publication Data

US 2018/0159650 A1     Jun. 7, 2018

Related U.S. Application Data

(60) Provisional application No. 62/406,875, filed on Oct. 11, 2016.

(51) Int. Cl.

| | |
|---|---|
| *H04B 10/00* | (2013.01) |
| *H04J 14/02* | (2006.01) |
| *H04B 10/58* | (2013.01) |
| *H04B 10/50* | (2013.01) |
| *H04B 10/67* | (2013.01) |

(52) U.S. Cl.
CPC ........ *H04J 14/0205* (2013.01); *H04B 10/504* (2013.01); *H04B 10/506* (2013.01); *H04B 10/58* (2013.01); *H04B 10/675* (2013.01); *H04J 14/0212* (2013.01); *H04J 14/022* (2013.01)

(58) Field of Classification Search
USPC .................................................. 398/182–201
See application file for complete search history.

(56) References Cited

U.S. PATENT DOCUMENTS

| | | | | |
|---|---|---|---|---|
| 5,453,868 A | * | 9/1995 | Blauvelt ............ | H04B 10/2507 372/32 |
| 6,262,834 B1 | * | 7/2001 | Nichols ................. | G02F 1/225 359/238 |
| 6,661,976 B1 | * | 12/2003 | Gnauck ............... | H04B 10/505 375/301 |

(Continued)

OTHER PUBLICATIONS

Chandrasekhar, S., et al., "Flexible Transport at 10-Gb/s from 0 to 675 km (11,500 ps/nm) Using a Chirp-Managed Laser, No DCF, and a Dynamically Adjustable Dispersion-Compensating Receiver," Optical Fiber Communication Conference and Exposition and The National Fiber Optic Engineers Conference, Technical Digest (CD) (Optical Society of America, 2005), Anaheim, California, USA, Paper PDP30, 3 pages, Mar. 2005.

(Continued)

*Primary Examiner* — Agustin Bello
(74) *Attorney, Agent, or Firm* — Perkins Coie LLP

(57) ABSTRACT

A technique for optical signal transmission includes generating a plurality of double sideband modulated optical signals by modulating a plurality of source data signals using a plurality of direct modulation laser (DML) optical sources, wherein the plurality of double sideband modulated optical signals occupy non-overlapping neighboring optical frequency bands, generating a chirp-managed laser (CML) output signal by multiplexing the plurality of double sideband modulated optical signals using a wavelength-selective multiplexer, and transmitting the CML output signal over an optical transport medium.

20 Claims, 21 Drawing Sheets

(56) References Cited

U.S. PATENT DOCUMENTS

| | | | | |
|---|---|---|---|---|
| 6,850,713 | B2* | 2/2005 | Kikuchi | H04B 10/505 359/237 |
| 7,027,669 | B2* | 4/2006 | Leuthold | G02F 1/225 359/279 |
| 7,162,164 | B2* | 1/2007 | Brown | H04B 10/505 398/183 |
| 7,206,520 | B2* | 4/2007 | Way | H04B 10/50 398/183 |
| 7,209,669 | B2* | 4/2007 | Kang | H04B 10/505 398/195 |
| 7,362,927 | B1* | 4/2008 | Ilchenko | G02F 1/21 385/15 |
| 7,391,550 | B2* | 6/2008 | Harris | G02F 1/116 359/264 |
| 7,639,955 | B2 | 12/2009 | Zheng et al. | |
| 7,697,847 | B2 | 4/2010 | Matsui et al. | |
| 7,809,280 | B2 | 10/2010 | Mahgerefteh et al. | |
| 7,860,404 | B2 | 12/2010 | Matsui et al. | |
| 7,941,057 | B2 | 5/2011 | Mahgerefteh et al. | |
| 7,974,534 | B2* | 7/2011 | Weiner | H04B 10/00 398/149 |
| 7,991,297 | B2 | 8/2011 | Mahgerefteh et al. | |
| 8,027,593 | B2 | 9/2011 | Zhou et al. | |
| 8,160,455 | B2 | 4/2012 | Mahgerefteh et al. | |
| 8,199,785 | B2 | 6/2012 | Zheng et al. | |
| 8,724,999 | B2* | 5/2014 | Cvijetic | H04J 14/06 398/152 |
| 2003/0231889 | A1* | 12/2003 | Brown | H04B 10/505 398/186 |
| 2004/0208428 | A1* | 10/2004 | Kikuchi | G02B 6/29358 385/24 |
| 2006/0210282 | A1* | 9/2006 | Iannelli | H04B 10/505 398/186 |
| 2007/0086788 | A1* | 4/2007 | Monteiro | H04B 10/505 398/186 |
| 2008/0002989 | A1* | 1/2008 | Cartaxo | H04B 10/505 398/183 |
| 2008/0240180 | A1* | 10/2008 | Matsui | H01S 5/06258 372/26 |
| 2010/0014862 | A1* | 1/2010 | Suzuki | H04B 10/5053 398/79 |
| 2010/0046003 | A1* | 2/2010 | Le Floch | G01J 3/10 356/486 |
| 2015/0071641 | A1* | 3/2015 | Wen | H04B 10/5165 398/98 |
| 2015/0155948 | A1* | 6/2015 | Chen | H04B 10/5165 398/188 |
| 2018/0159650 | A1* | 6/2018 | Yu | H04B 10/506 |

OTHER PUBLICATIONS

Gao, J., et al., "Demonstration of the First 29dB Power Budget of 25-Gb/s 4-PAM System without Optical Amplifier for Next Generation Access Network," Optical Fiber Communication Conference, OSA Technical Digest (online) (Optical Society of America, 2016), Anaheim, California, USA, Paper Th11.2, 3 pages, Mar. 2016.

Li, F., et al., "Real-time Reception of Four Channels 50 Gb/s Class High-level QAM-DMT Signal in Short Reach," Optical Fiber Communication Conference, OSA Technical Digest (online) (Optical Society of America, 2016), Anaheim, California, USA, Paper Th2A.3, 3 pages, Mar. 2016.

Li, S., et al., "Demonstration of a Real-Time 25-Gb/s TDM-PON System with 25-Gb/s Downstream Based on Optical Duobinary and 10-Gb/s Burst-Mode Upstream Based on NRZ," Optical Fiber Communication Conference, OSA Technical Digest (online) (Optical Society of America, 2016), Anaheim, California, USA, Paper Th11.3, 3 pages, Mar. 2016.

Mahgerefteh, D., et al., "Error-free 250 km transmission in standard fibre using compact 10 Gbit/s chirp-managed directly modulated lasers (CML) at 1550 nm," Electronics Letters, 41(9):543-544, Apr. 2005.

Man, J., et al., "Downstream Transmission of Pre-Distorted 25-Gb/s Faster-than-Nyquist PON with 10G-Class Optics Achieving over 31 dB Link Budget without Optical Amplification," Optical Fiber Communication Conference, OSA Technical Digest (online) (Optical Society of America, 2016), Anaheim, California, USA, Paper Th11.5, 3 pages, Mar. 2016.

Matsui, Y., et al., "Chirp-Managed Directly Modulated Laser (CML)," IEEE Photonics Technology Letters, 18(2):385-387, Jan. 2006.

Tao, M., et al., "28Gb/s/λ, TDM-PON with Narrow Filter Compensation and Enhanced FEC Supporting 31.5 dB Link Loss Budget after 20-km Downstream Transmission in the C-band," Optical Fiber Communication Conference, OSA Technical Digest (online) (Optical Society of America, 2016), Anaheim, California, USA, Paper Th11.4, 3 pages, Mar. 2016.

Yi, L., et al., "Field-Trial of a Real-Time 100 Gb/s TWDM-PON Based on 10G-Class Optical Devices," Proceedings of 42nd European Conference on Optical Communication (ECOC 2016), Dusseldorf, Germany, Paper W.3.E.1, pp. 683-685, Sep. 2016.

Yu, J., "42.8 Gb/s Chirp-Managed Signal Transmission over 100 m Graded-Index Plastic Optical Fiber," Optical Fiber Communication Conference/National Fiber Optic Engineers Conference, OSA Technical Digest (CD) (Optical Society of America, 2008), San Diego, California, USA, Paper PDP28, 3 pages, Feb. 2008.

Yu, J., et al., "Applications of 40-Gb/s Chirp-Managed Laser in Access and Metro Networks," Journal of Lightwave Technology, 27(3):153-265, Feb. 2009.

* cited by examiner

CHIRP MANAGED LASER GENERATION FOR NEXT GENERATION PASSIVE OPTICAL NETWORKS

CROSS REFERENCE TO RELATED APPLICATIONS

This patent document claims the benefit of U.S. Provisional Patent Application No. 62/406,875, filed on Oct. 11, 2016. The entire content of the before-mentioned patent application is incorporated by reference as part of the disclosure of this document.

BACKGROUND

The wide-spread adoption of multimedia services, broadband internet, and cloud services, among others, has driven the demand of high transmission capacity of optical systems such as short-reach links, access, and metro networks.

SUMMARY

The present document discloses, among other things, transmission technology that can be used to achieve 28 Gbps transmission rate on next generation passive optical networks (NG-PON) with 10G-class direct modulation lasers (DMLs) and optical receivers. In some disclosed embodiments, only one pair of wavelength division multiplexing (WDM) couplers are used to realize WDM signal multiplexing, demultiplexing and chirp managed laser (CML) signal generation. We demonstrate over 40 km single mode fiber (SMF-28) CML signal transmission without dispersion compensation even in absence of expensive digital to analog conversion (DAC), analog to digital conversion (ADC) and digital signal processing (DSP) chips.

In one example aspect, a method of optical communication, implemented at a transmitter, is disclosed. The method includes generating a plurality of double sideband modulated optical signals by modulating a plurality of source data signals using a plurality of direct modulation laser (DML) optical sources, wherein the plurality of double sideband modulated optical signals occupy non-overlapping neighboring optical frequency bands, generating a chirp-managed laser (CML) output signal by multiplexing the plurality of double sideband modulated optical signals using a wavelength-selective multiplexer, and transmitting the CML output signal over an optical transport medium.

In another example aspect, an optical transmission apparatus is disclosed. The apparatus includes a plurality of direct modulated laser (DML) sources each having data input and output ports and producing a plurality of double sideband modulated optical signals on a plurality of optical communication channels, a wavelength-selective multiplexer having a plurality of input ports, the wavelength-selective multiplexer configured to generate a chirp-managed laser (CML) signal based on the plurality of double sideband modulated optical signals, and an output port at which the generated CML signal is output, and transmission circuitry having an input port coupled to the output port of the wavelength-selective multiplexer and an output port coupled to an optical transmission medium for transmitting an optical signal generated from the CML signal.

In yet another aspect, a method of optical communication, implemented at a transmitter, is disclosed. The method includes generating a first plurality of double sideband modulated optical signals by modulating a first plurality of source data signals using a first plurality of direct modulation laser (DML) optical sources, wherein the first plurality of double sideband modulated optical signals occupy non-overlapping odd-numbered optical transmission channels, generating a first intermediate optical signal by multiplexing the first plurality of double sideband modulated optical signals using a wavelength division multiplexing coupler, generating a second plurality of double sideband modulated optical signals by modulating a second plurality of source data signals using a second plurality of direct modulation laser (DML) optical sources, wherein the second plurality of double sideband modulated optical signals occupy non-overlapping even-numbered optical transmission channels, generating a second intermediate optical signal by multiplexing the second plurality of double sideband modulated optical signals using a wavelength division multiplexing coupler, generating a chirp-managed laser (CML) output signal by interleaving the first intermediate optical signal and the second intermediate optical signal using an optical interleaver, and transmitting the CML output signal over an optical transport medium.

In yet another aspect, a method of optical communication, implemented at a receiver is disclosed. The method includes receiving an optical signal comprising modulated information bits carried over a plurality of multiplexed optical channels, demultiplexing the optical signal using a wavelength-selective demultiplexer to separate out optical signals from the plurality of multiplexed optical channels, wherein each of the separated signal comprises a double sideband modulated optical signal, and demodulating the double sideband modulated optical signals to recover the information bits.

In yet another aspect, an apparatus for optical communication is disclosed. The apparatus includes an optical front end that receives an optical signal comprising modulated information bits carried over a plurality of multiplexed optical channels, a wavelength-selective demultiplexer having an input port and a plurality of output ports, the input port being coupled to an output of the optical front end, the wavelength-selective demultiplexer demultiplexing the optical signal to separate out optical signals from the plurality of multiplexed optical channels, wherein each of the separated signal comprises a double sideband modulated optical signal, and a plurality of optical demodulators coupled to the plurality of output ports of the wavelength-selective demultiplexer and demodulating a double sideband modulated optical signals to recover the information bits.

These and other aspects, and example implementations and variations are set forth in the drawings, the description and the claims.

DETAILED DESCRIPTION

Figure 1:
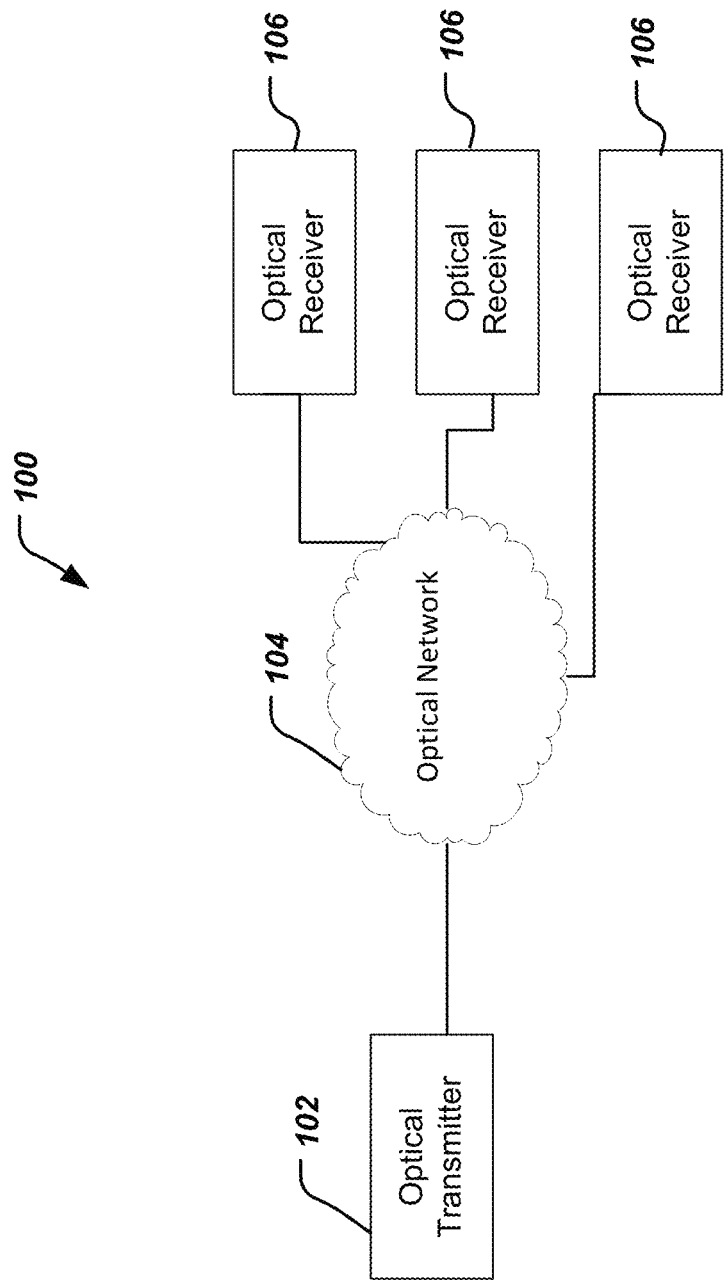
FIG. 1 shows an example block diagram of a system to transmit and receive signals.

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively, or in addition, data modulation can also be achieved in the optical domain.

25 Gbps or higher per channel for passive optical networks (PON) is widely under study, and pulse amplitude modulation 4 (PAM4), Nyquist WDM signal, discrete multitone (DMT) and duobinary modulation formats are potential solutions. However, PAM4, Nyquist WDM signal and DML need expensive DAC and ADC as well as DSP procession, and duobinary modulation has worse receiver sensitivity. Chirped-managed laser (CML) can provide a good optical source for access system. In order to support high dispersion tolerance, a distributed feedback (DFB) laser biased at high direct current (DC) far above the threshold is used, digital data directly modulates this DFB laser, and a suitable optical filter is used to control the phase flip between the adjacent bits. To our knowledge, 10 Gbps CML is commercially available and deployed in the real optical networks. In this commercial 10 Gps CML, each laser needs one tunable optical filter. Because the bit rate is low, at 10 Gb/s, the bandwidth of the filter should be narrow, narrower than 20 GHz. To our knowledge, it is difficult to manufacture the narrow band filter and to precisely control its wavelength to match the wavelength of DFB laser. When the bit rate is higher, such as 28 Gb/s or higher, the bandwidth of the filter can be wider. Wider bandwidth optical filter is easier to manufacture. In fact, as disclosed herein, the tunable optical filter (TOF) can be replaced by one commercial WDM coupler or arrayed waveguide grating (AWG). By this way, implementations can use one WDM coupler or AWG to realize multi-channel CML signal generation. Here we disclose a novel scheme for CML WDM signals generation and transmission for WDM-PON. Our experimental results show that there is over 10 dB power margin even if the transmission distance is over 30 km. Because no ADC, DAC, DSP and dispersion compensation is used, it is a cost-effective operation. Different from the recent demonstration with one bit rate of 25.59-Gb/s, we use one higher bit rate at 28 Gb/s and one lower cost commercial WDM coupler to generate CML signal. Considering FEC (7%) and Ethernet (~5%) overhead, the signal bit rate should be ~28 Gb/s for a net bit rate of 25 Gb/s signal.

PAM4, DML and duobinary modulation formats are potential solutions for modulation of individual laser sources used in the described embodiments. The trade-off being that the use of PAM4 and DML needs expensive DAC and ADC also needs DSP procession. Duobinary typically has worse receiver sensitivity.

Chirped-managed laser (CML) can provide a good optical source for access system. In order to support high dispersion tolerance, a DFB laser biased at high direct current (DC) far above the threshold (typically four to ten times the normal bias) is used, digital data directly modulate this DFB laser, and a suitable optical filter is used to control the phase between the adjacent bits.

10 Gbps CML is commercially available. In this commercial CML, each laser needs one tunable optical filter. Because the bit rate is relatively low, only 10 Gb/s, the bandwidth of the filter should be narrow. To our knowledge, for the narrow band filter, it is difficult to manufacture, and also the wavelength should be precisely controlled to match the wavelength of DFB laser.

When the bit rate is higher, such as 28 Gb/s or higher, the bandwidth of the filter will be wider. Wide bandwidth optical filter typically is easy to be manufactured. The TOF can be replaced by commercial WDM coupler or AWG. We can use one WDM coupler or AWG to realize multi-channel CML signal generation.

Here we disclose, among other things, two novel schemes for CML WDM signals generation and transmission. Experimental results based on the two schemes are demonstrated that our new schemes can get good performance.

FIG. 1 shows an example block diagram of an optical communication system to transmit and receive signals. FIG. 1 depicts an optical communication system 100 in which the presently disclosed technology can be embodied. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

Figure 2A:
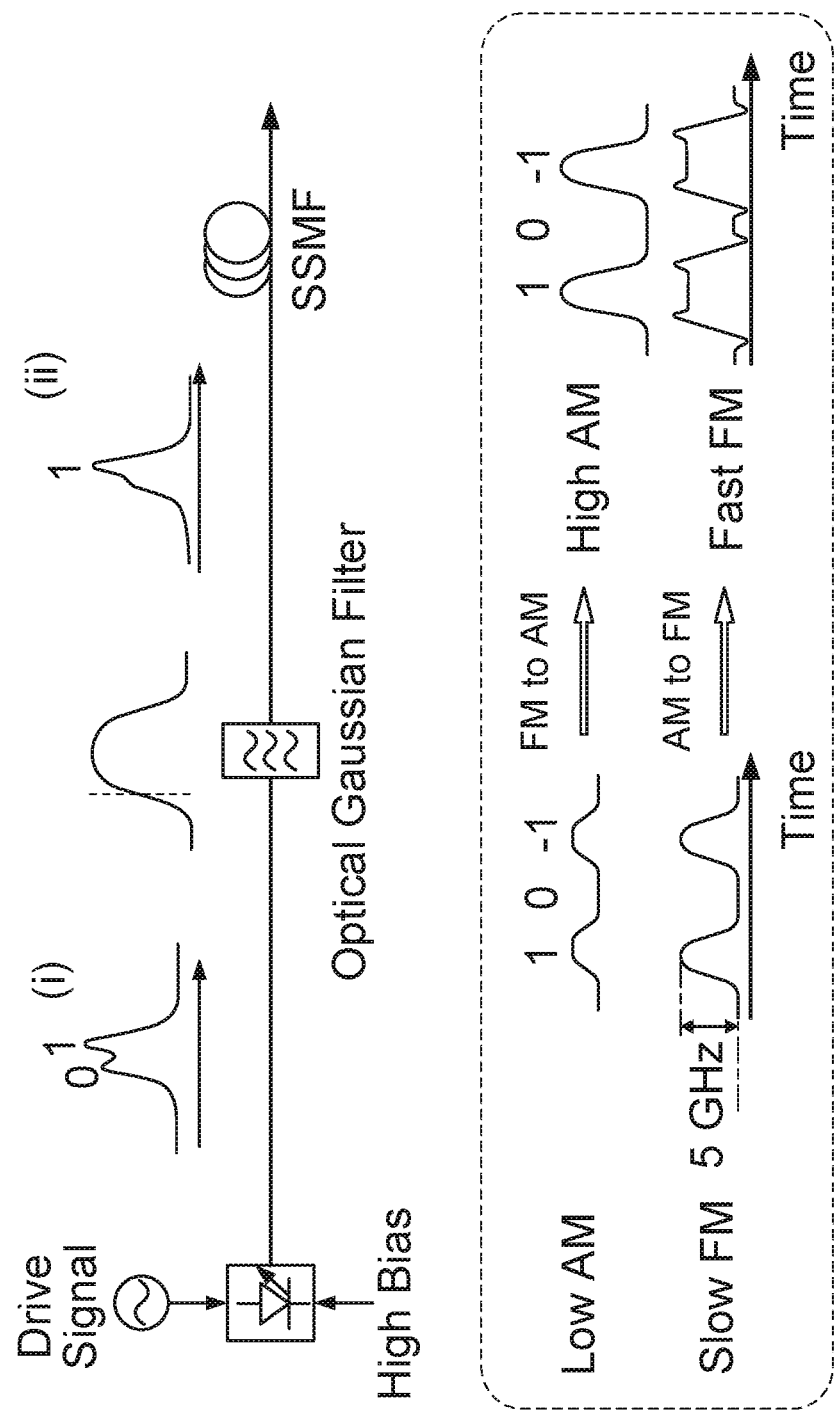
FIG. 2A illustrates an example CML generation technique.

A CML transmitter comprises a directly modulated laser (DML) and the subsequent optical filter, and its schematic diagram is shown in FIG. 2A. The highly chirp-controlled modulation creates two distinct frequency peaks in inset (i) of FIG. 2A. The main function of the filter (optical Gaussian filter, in this case) is to increase the extinction ratio by passing the "1" bits while attenuating "0" bits in inset (ii). In some embodiments disclosed herein, to realize the proper phase flip between the bits, a much higher driven bias compared to the conventional direct modulation is employed (4× to 10×). The additional benefits of the higher bias are the higher output power and wider modulation bandwidth due to the high operation point. Implementations can also achieve the stable signal mode operation and low timing jitter, and make the laser to be the adiabatic chirp dominated via suppression of the transient chirp because the working condition is far away from the threshold of the laser.

Figure 2B:
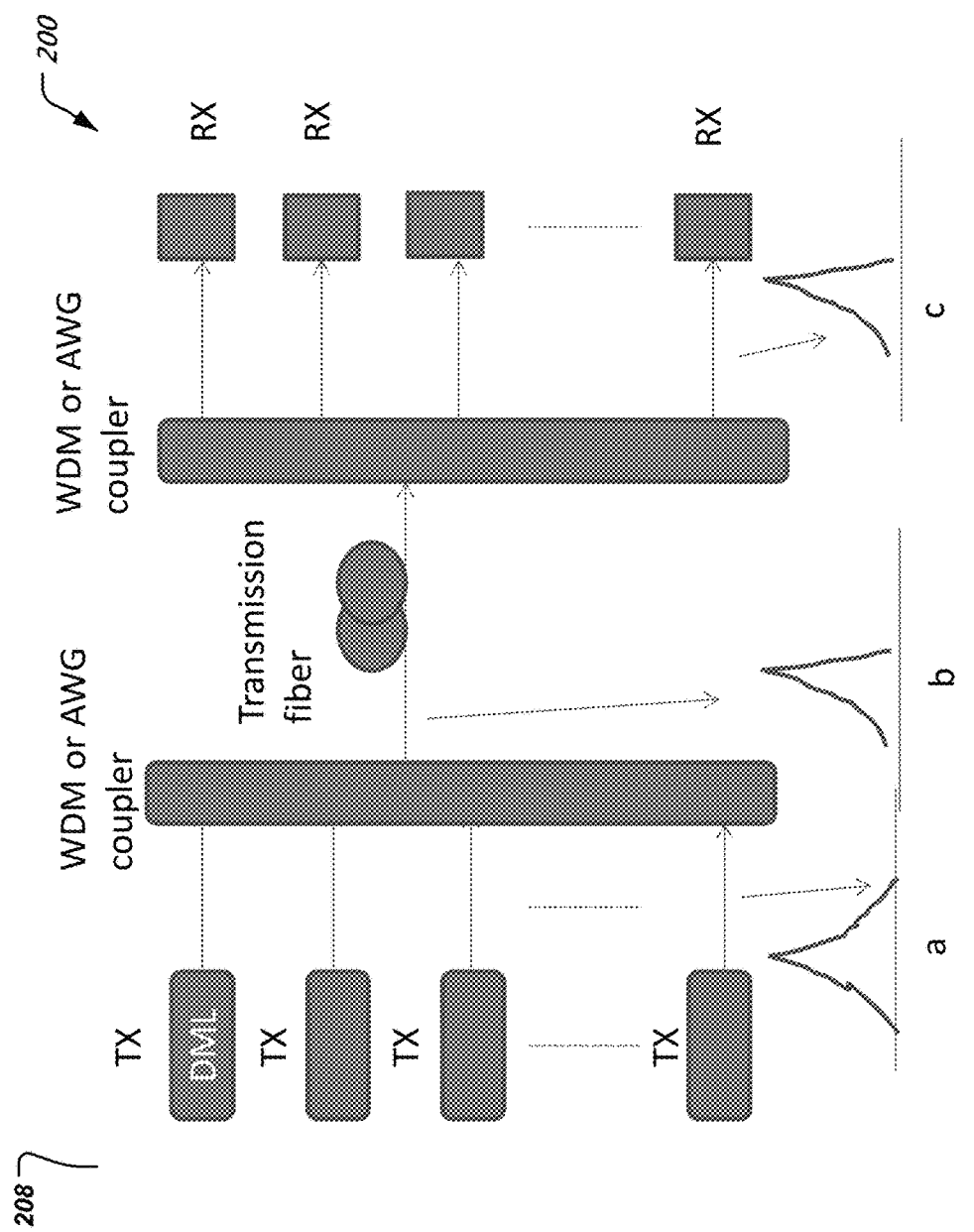
FIG. 2B is a block diagram of an example CML system using a wavelength division multiplexing (WDM) or an arrayed waveguide grating (AWG) coupler.

FIG. 2B shows principle of CML WDM-PON. In an example embodiment, a CML system combines WDM signals and generates CML WDM signals. The CML system may have one or more couplers that combine the WDM signals and generate the CML WDM signals. Each transmission channel (TX) has one DML biased at high DC far above the threshold driven by OOK signal (e.g., 4 to 10 times the threshold for DML lasers). The transmission channels may be adjacent channels or may be further separated. Implementations can use one WDM or AWG to combine or multiplex some or all WDM signals. For example, one coupler (e.g., WDM or AWG) may be used to combine or multiplex some or all WDM signals. No additional filters such as tunable optical filters may be used to perform any type of additional optical filtering. In FIG. 2B, the CML system may have a first coupler (e.g., WDM or AWG), which receives signals from the transmission channels, and a second coupler (e.g., WDM or AWG). This first coupler (e.g., WDM or AWG) is used to combine WDM signals and generate CML WDM signals. Due to the optical properties of the wavelength-selective WDM or AWG couplers, the double sideband signal output of DML sources (See spectrum a) is converted to a single sideband signal (SSB) (see spectrum b).

If CML performance is not good, e.g., does not meet an expected optical extinction ratio, the second coupler (e.g., WDM or AWG) will perform further operations (see spectrum c). The second coupler (e.g., WDM or AWG) is used to separate WDM signals, and also further reshape the signal waveform. After passing though the two cascaded couplers (e.g., WDM or AWG), good performance CML WDM signals are generated. In this context, "good performance" may mean high optical extinction ratio and high receiver sensitivity.

Figure 3:
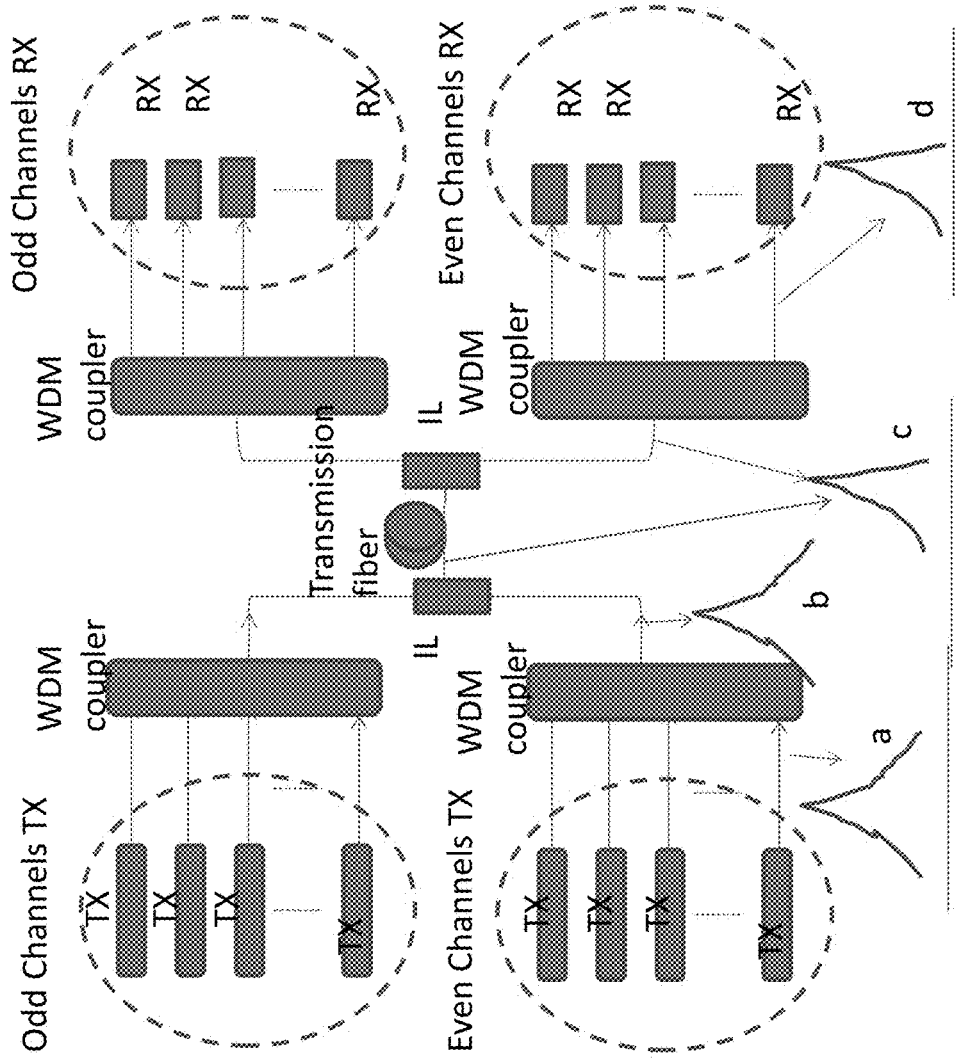
FIG. 3 is a block diagram of an example CML system using an optical interleaver.

FIG. 3 is a block diagram of an example CML system using an optical interleaver. The CML system may have one or more couplers that combine the WDM signals and generate the CML WDM signals. In an example embodiment, a CML system may divide WDM channels into two or more groups of WDM channels. For example, the CML system divides the WDM channels into odd and even channels. Implementations may use a first coupler (e.g., WDM or AWG) to combine odd-multi-channel WDM signals. In an example embodiment, the first coupler (e.g., WDM or AWG) is used only for coupling purposes. The optical spectrum typically is not changed after signals pass through WDM coupler (see spectrum a and b) due to separation among the odd (or even) channels. Next, a single optical interleaver (IL) may be used to combine signals originating from odd and even WDM channels. Also this optical interleaver is used to realize CML signal generation. See spectrum c. After the IL, double sideband signal (see b) is converted to SSB (see c). The second IL is used to separate the combined signal into odd and even channel signals, and is also used to further reshape the spectrum. The second coupler (e.g., WDM or AWG) is used to separate WDM signal. The implementation depicted in FIG. 3 also is exclusive of any optical filters or tunable optical filters to specifically shape the modulated signals and simply relies on the optical characteristics of the optical interleaver.

Figure 4:
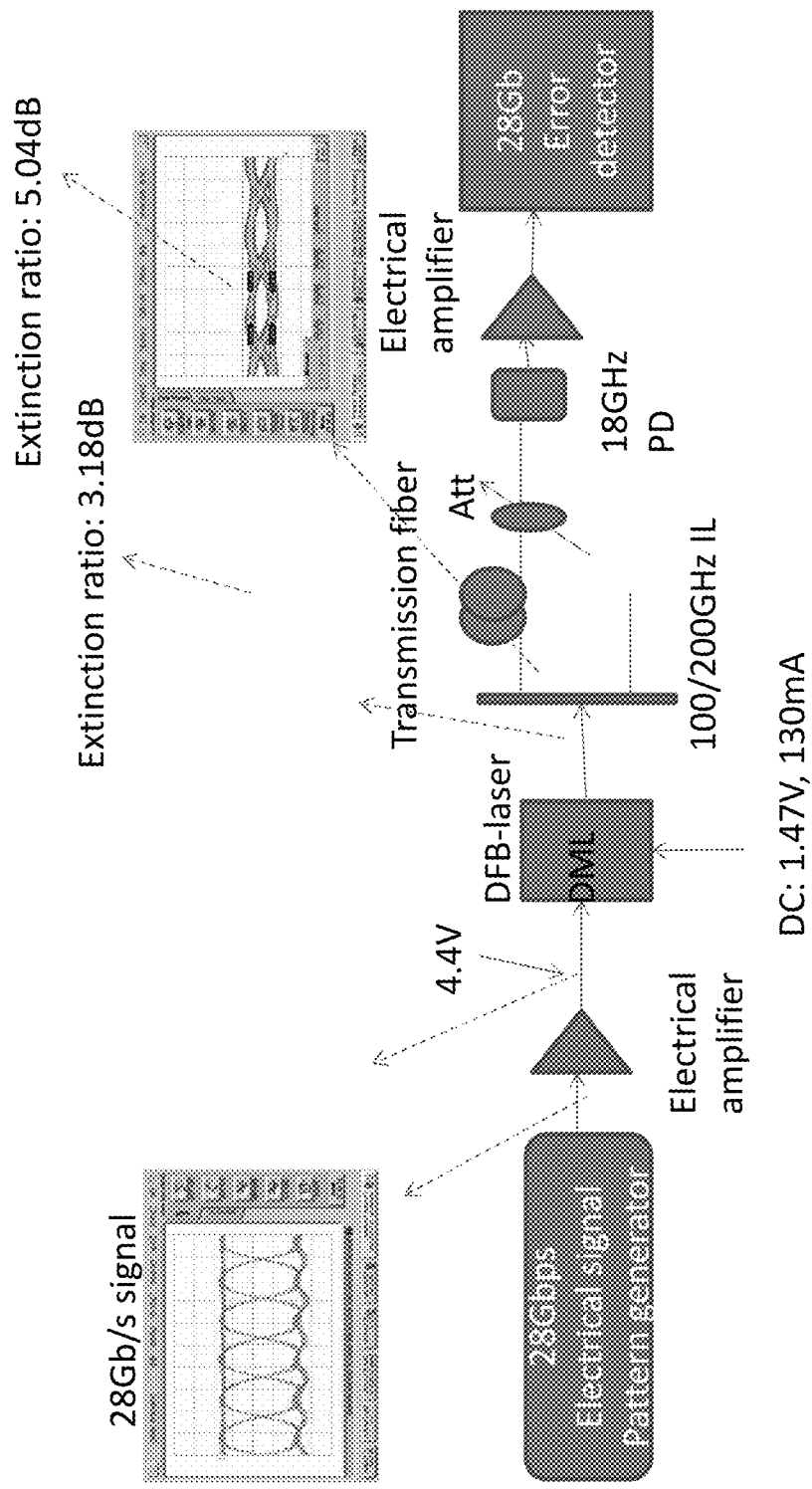
FIG. 4 is a block diagram of another example CML system using an optical interleaver.

FIG. 4 is a block diagram of another example CML system using an optical interleaver. A 28 Gbps source is passed through an electrical amplifier, modulating a DFB laser, which is then passed through an optical interleaver and a transmission fiber. For experimental calculator, the signal is received at a photodiode that performs demodulation and error detection to measure the performance of the system.

Figure 5:
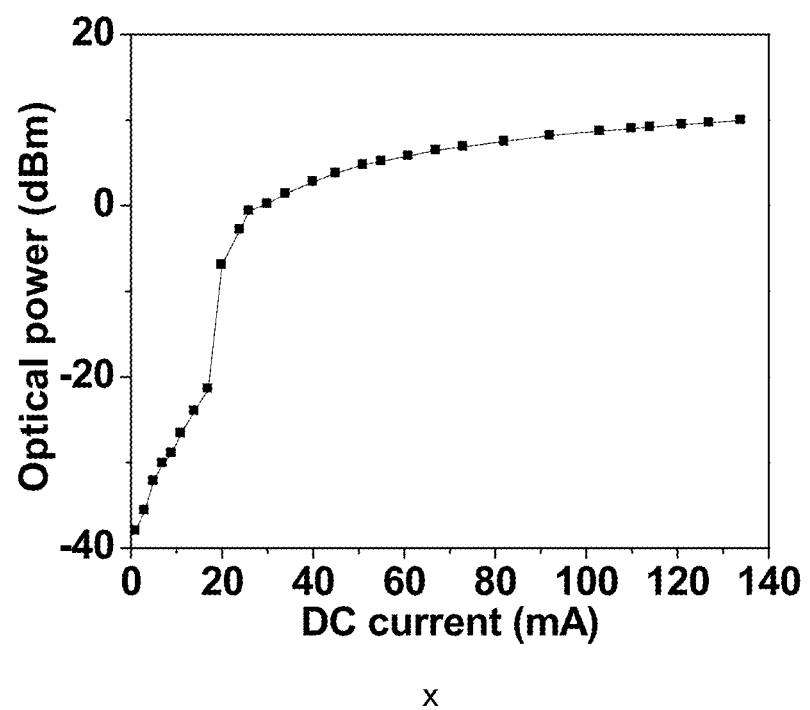
FIG. 5 is a graph showing DC bias current vs optical power of DML laser of an example embodiment.

FIG. 5 is a graph showing DC bias current vs optical power of DML laser of an example embodiment. An operational point in the flat region (roughly 80 to 120 mA) may yield optimal results because along these DC currents, optical power may not appreciably increase with increased bias current.

Figure 6:
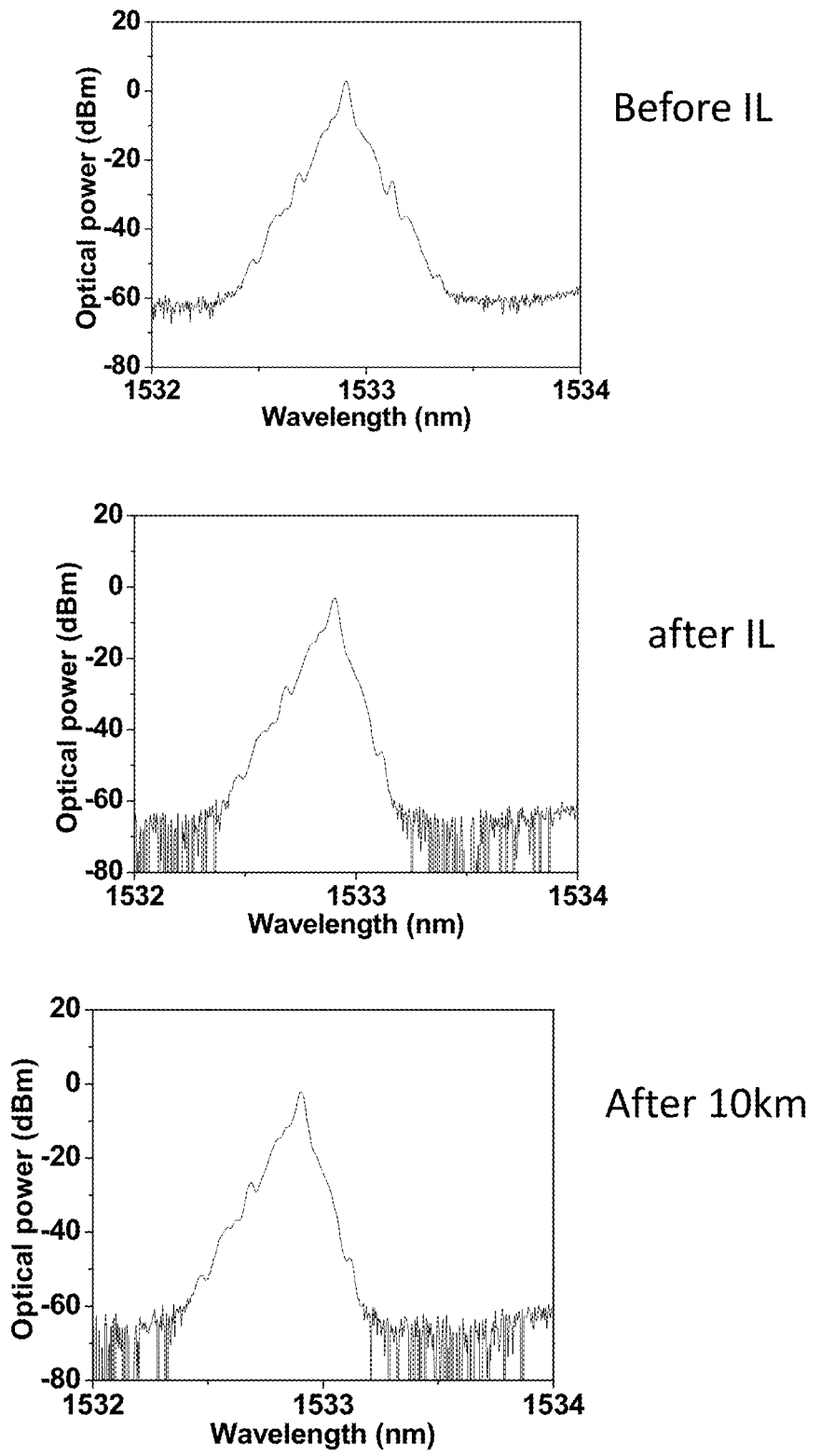
FIG. 6 shows example optical spectra in a 28 Gb/s implementation.

FIG. 6 shows example optical spectra in a 28 Gb/s implementation, before optical interleaver, immediately after optical interleaver and after 10 Km transmission through an optical fiber.

Figure 7A:
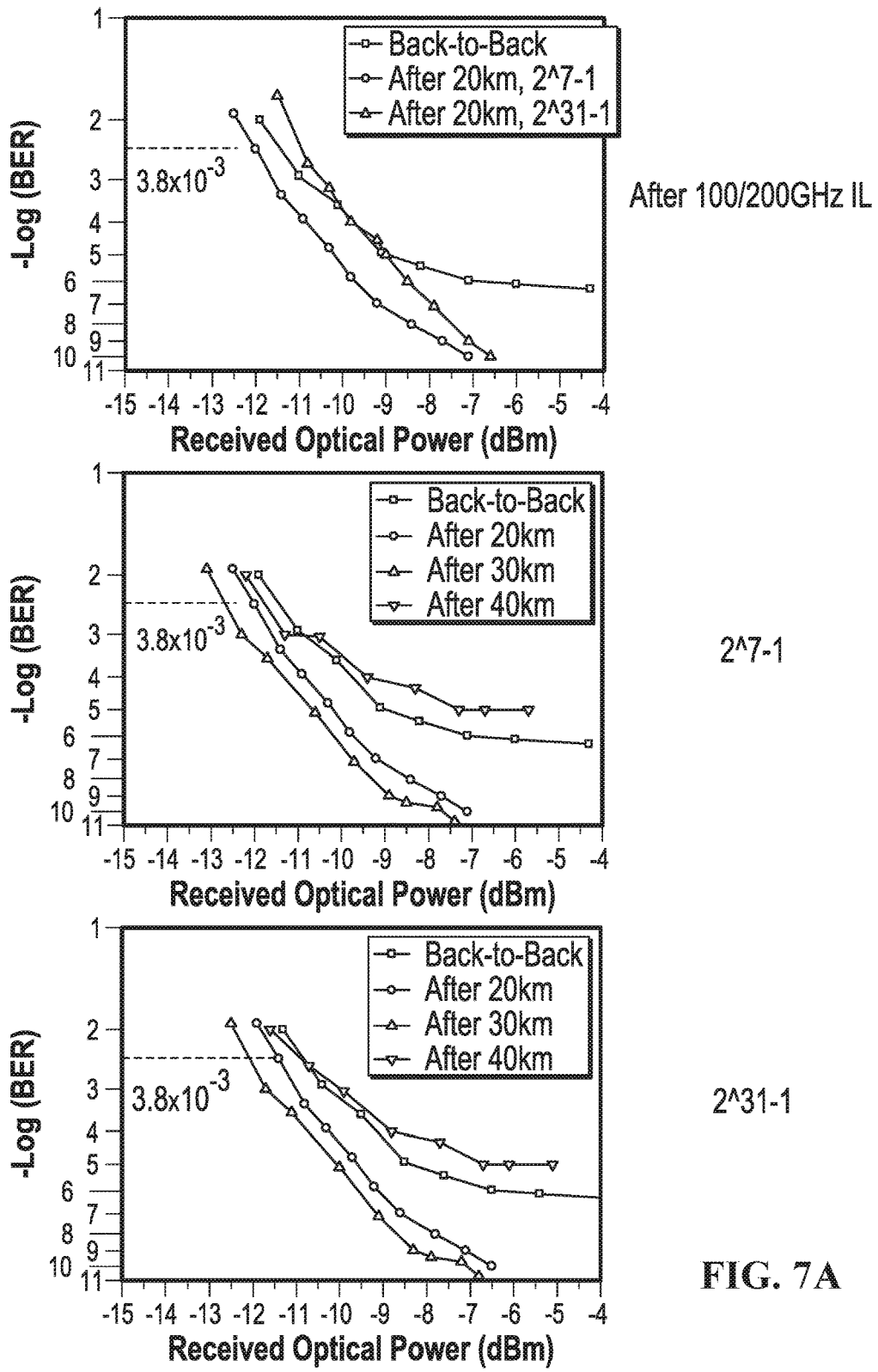
FIG. 7A is a graph showing performance results of an example 28 Gb/s CML embodiment after 100/200 GHz optical interleaver.

FIG. 7A is a graph showing performance results of an example 28 Gb/s CML embodiment after 100/200 GHz optical interleaver, using different pseudorandom binary sequences for experiments. Here, $2^7-1$ and $2^{31}-1$ pseudorandom binary sequences are used, and there is about 0.5 dB receiver sensitivity. After 20 Km transmission, the difference is small. After 30 Km transmission, however, the best receiver sensitivity is obtained by the pulse shape change due to fiber dispersion.

Figure 7B:
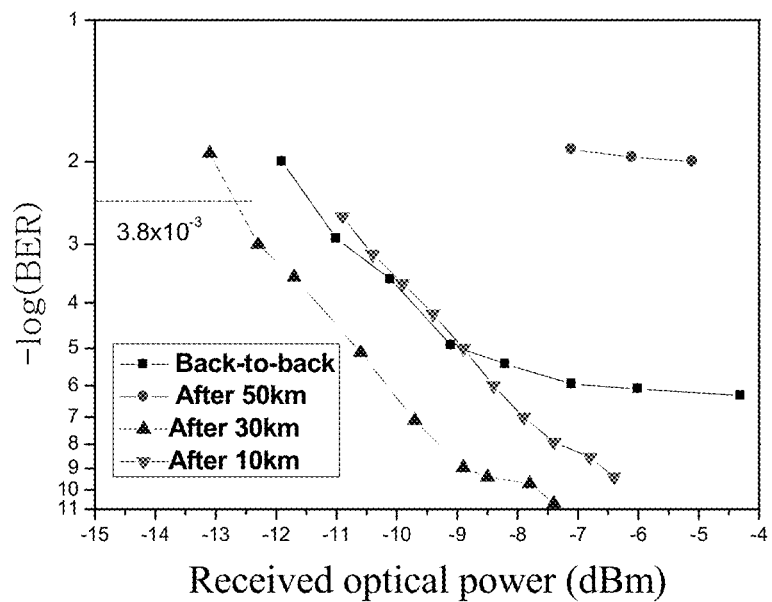
FIG. 7B shows a graph for power margin in an example embodiment.
Figure 7B:
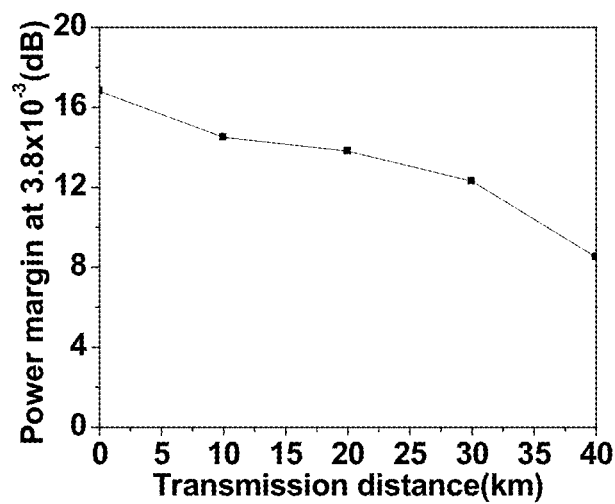

FIG. 7B shows a graph for power margin in an example embodiment. There is over 10 dB power margin after transmission over 30 km. If one reamplifier can be added at the receiver or one APD receiver is used, it should result in over 30 dB power margin available.

Figure 8:
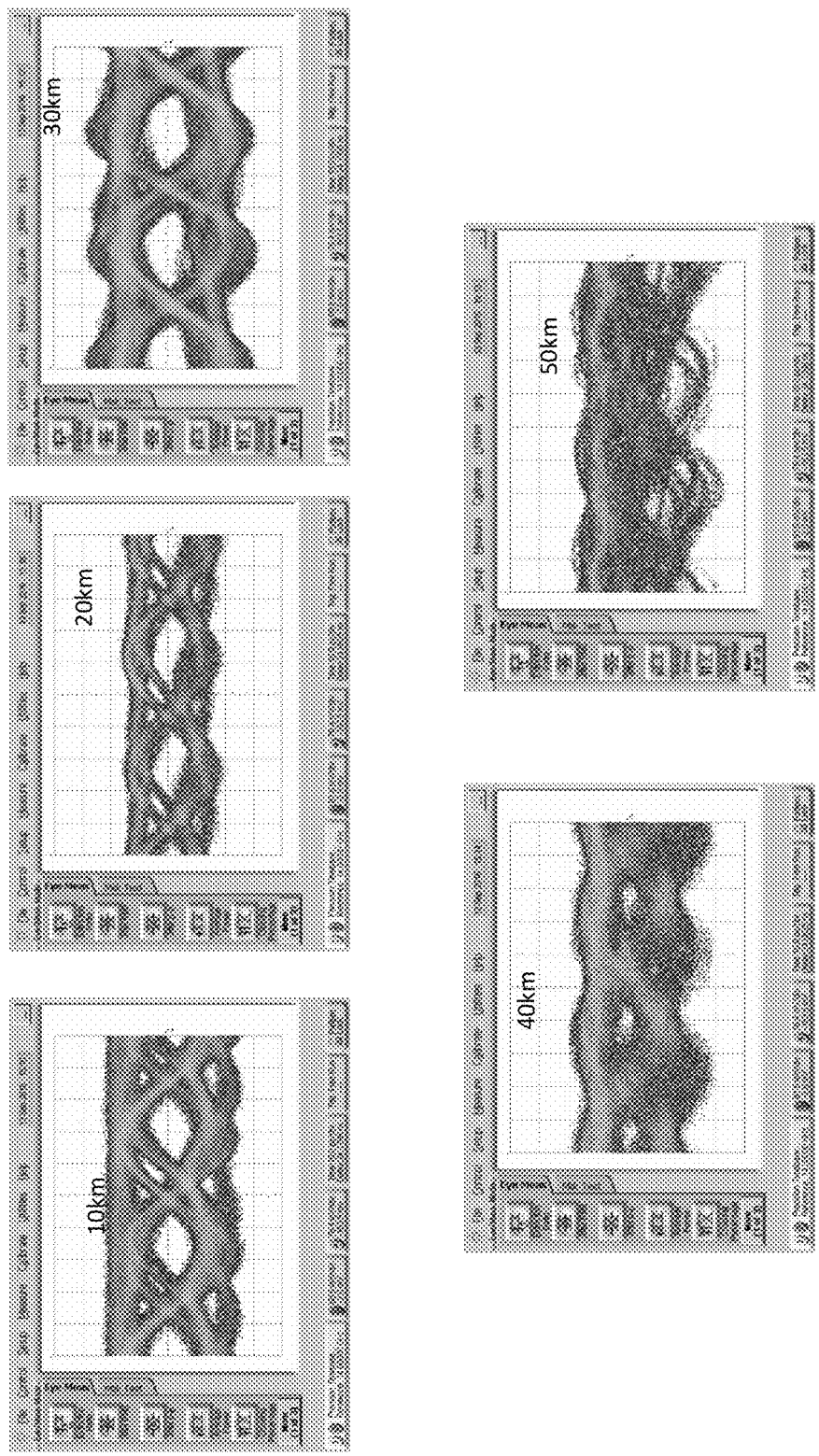
FIG. 8 shows examples of eye diagrams as a function of transmission distance.
Figure 11A:
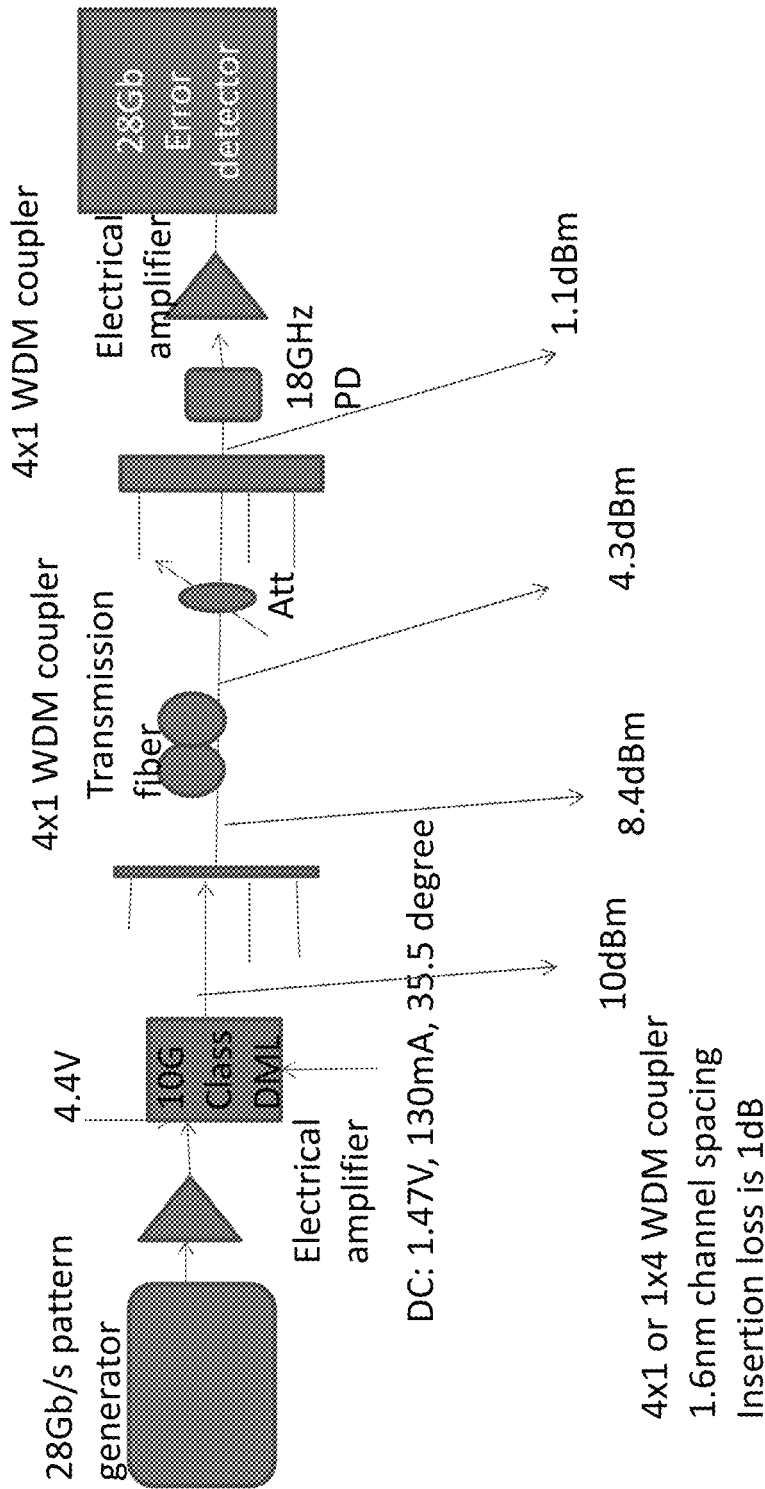
FIG. 11A shows a block diagram of a CML system based on WDM muxing.
Figure 11B:
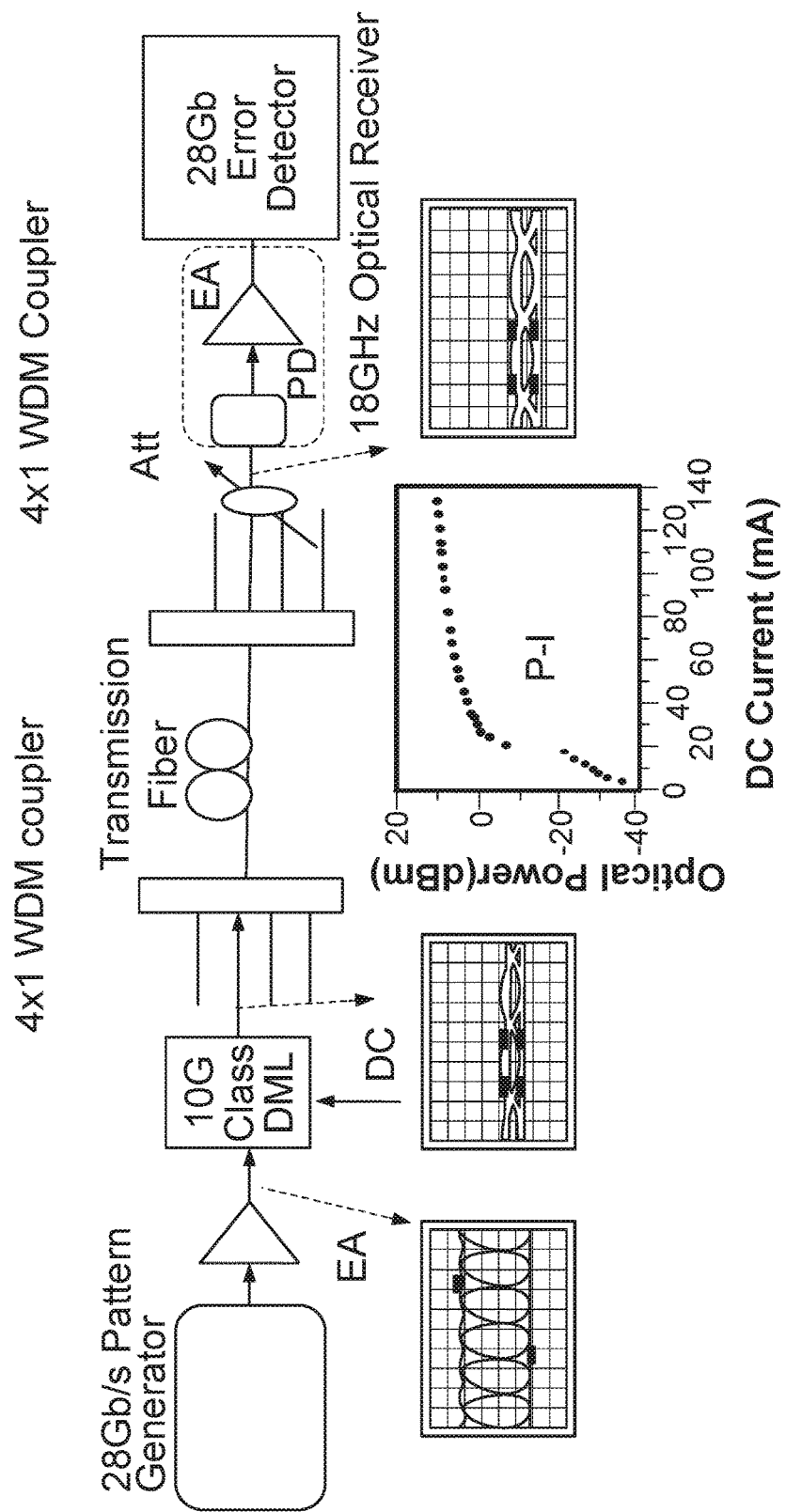
FIG. 11B shows a block diagram of another example CML system using WDM muxing.

FIG. 8 shows examples of eye diagrams as a function of transmission distance of embodiments described further with respect to FIG. 11B.

Figure 9:
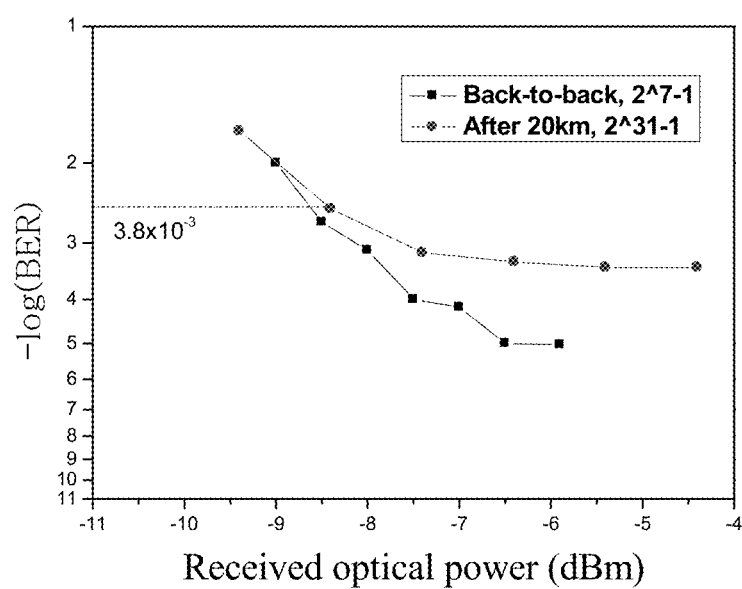
FIG. 9 shows a graph of performance of an embodiment without optical interleaver.

FIG. 9 shows a graph of performance of an embodiment without optical interleaver, when no filter is used and a $2^{31}-1$ pseudo-random binary sequence (PRBS) is used for simulations. A bit error rate (BER) is also measured with respect to the embodiment without IL. In this case, because no IL is used, the signal is regular OOK signal, and not CML. After 20 km, error floor appears at $4 \times 10^{-4}$. The performance is degraded.

Figure 10:
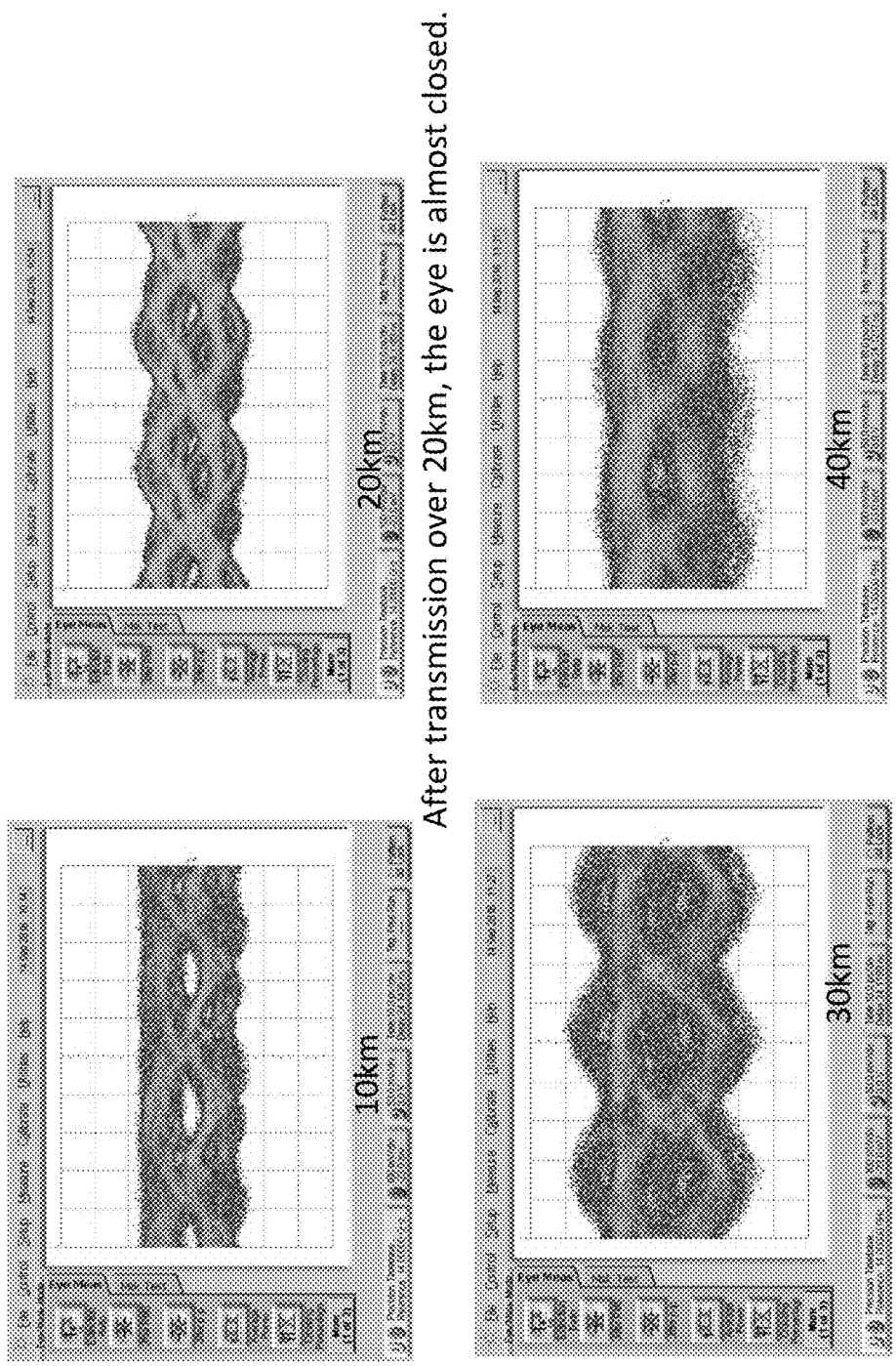
FIG. 10 shows eye diagrams as a function of distance of an embodiment without optical interleaver.

FIG. 10 shows eye diagrams as a function of distance of an embodiment without optical interleaver. After transmission over 20 km, the eye is almost closed. Once again, this shows the usefulness of performing CML using an optical interleaver.

FIG. 11A shows a block diagram of a CML system based on WDM. A 4×1 or 1×4 WDM coupler with 1.6 nm channel spacing may be used. The insertion loss thereof is 1 dB.

FIG. 11B shows another similar experimental setup. Here only one CML signal is being transmitted, e.g., to simulate a single-channel case. A 28 Gb/s OOK signal with a PRBS length of $2^{31}-1$ is generated from one commercial pattern generator. Then this electrical signal is boosted to $4V_{p-p}$ by one electrical amplifier before it is used to drive the 10G-class DML (NLK1551SSL). This DML is DC biased at 130 mA with one output power of 10 dBm.

FIG. 11B shows a system similar to that shown in FIG. 11A, with the measured P-I curve of this DML inserted in FIG. 11B.

Figure 12:
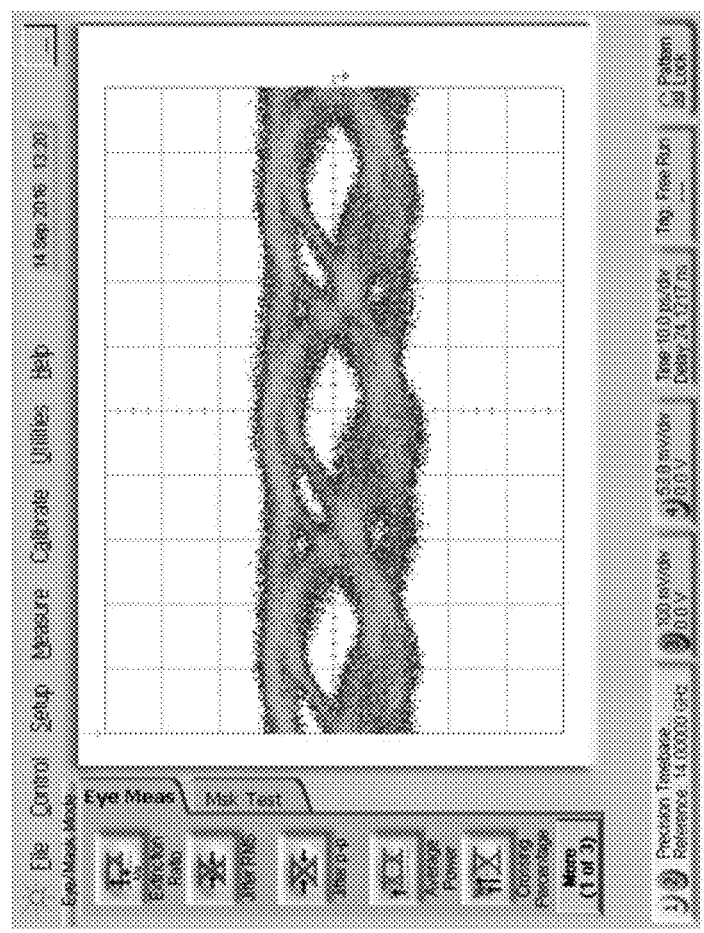
FIG. 12 shows an eye diagram after 20 Km transmission in a CML embodiment.

FIG. 12 shows an eye diagram after 20 Km transmission in an CML embodiment. The eye diagram has no difference between this scheme based on WDM coupler and based on IL. The BER performance is the same. In other words, both WDM coupler based CML and IL based CML transmission systems could be used by transmitters.

Figure 13:
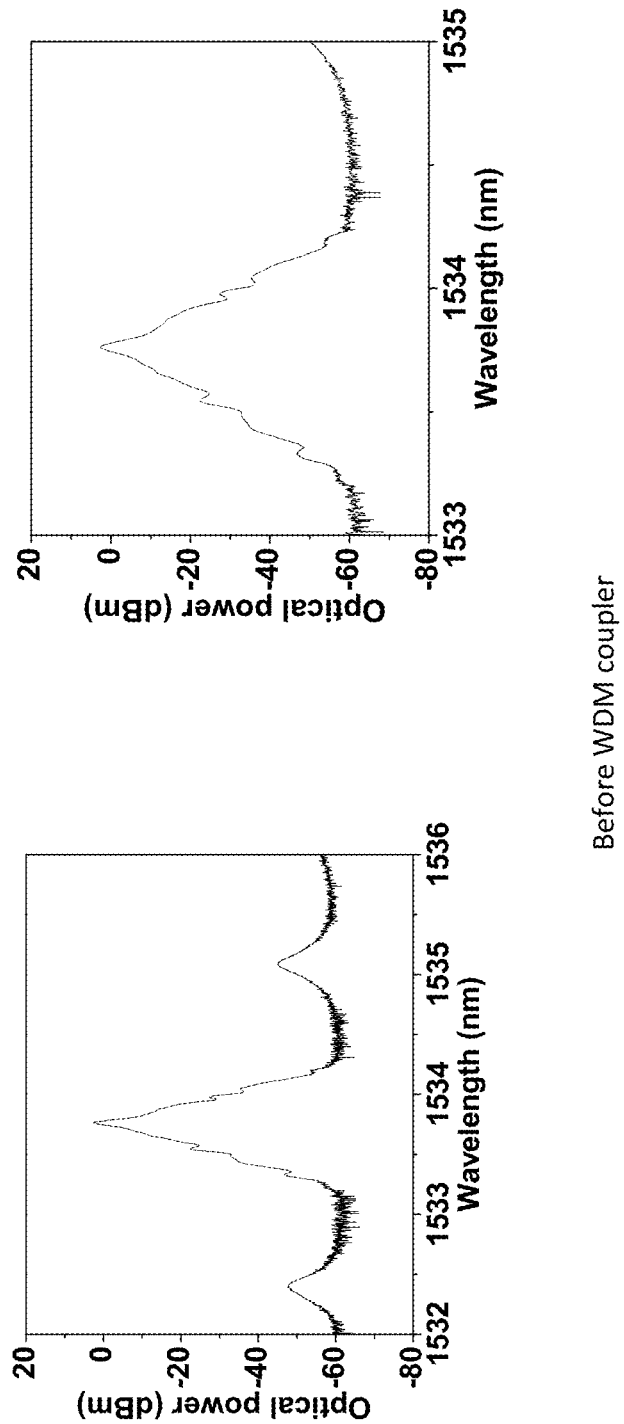
FIG. 13 shows optical spectra of an example 28 Gb/s embodiment.

The optical spectrum after the DML is shown in FIG. 13 and the eye diagram is inserted in FIG. 11B. The measured extinction ratio (ER) is 3.18 dB. The eye diagram after passing through the two identical 4×1 WDM couplers with 1.6 nm channel spacing (four channels operated at 1530.33, 1531.19, 1533.47 and 1535.04 nm and we use 1533.47 nm channel) is inserted in FIG. 11B (no transmission fiber is added at this case). The ER is 5.04 dB after the two cascaded WDM couplers.

Figure 14:
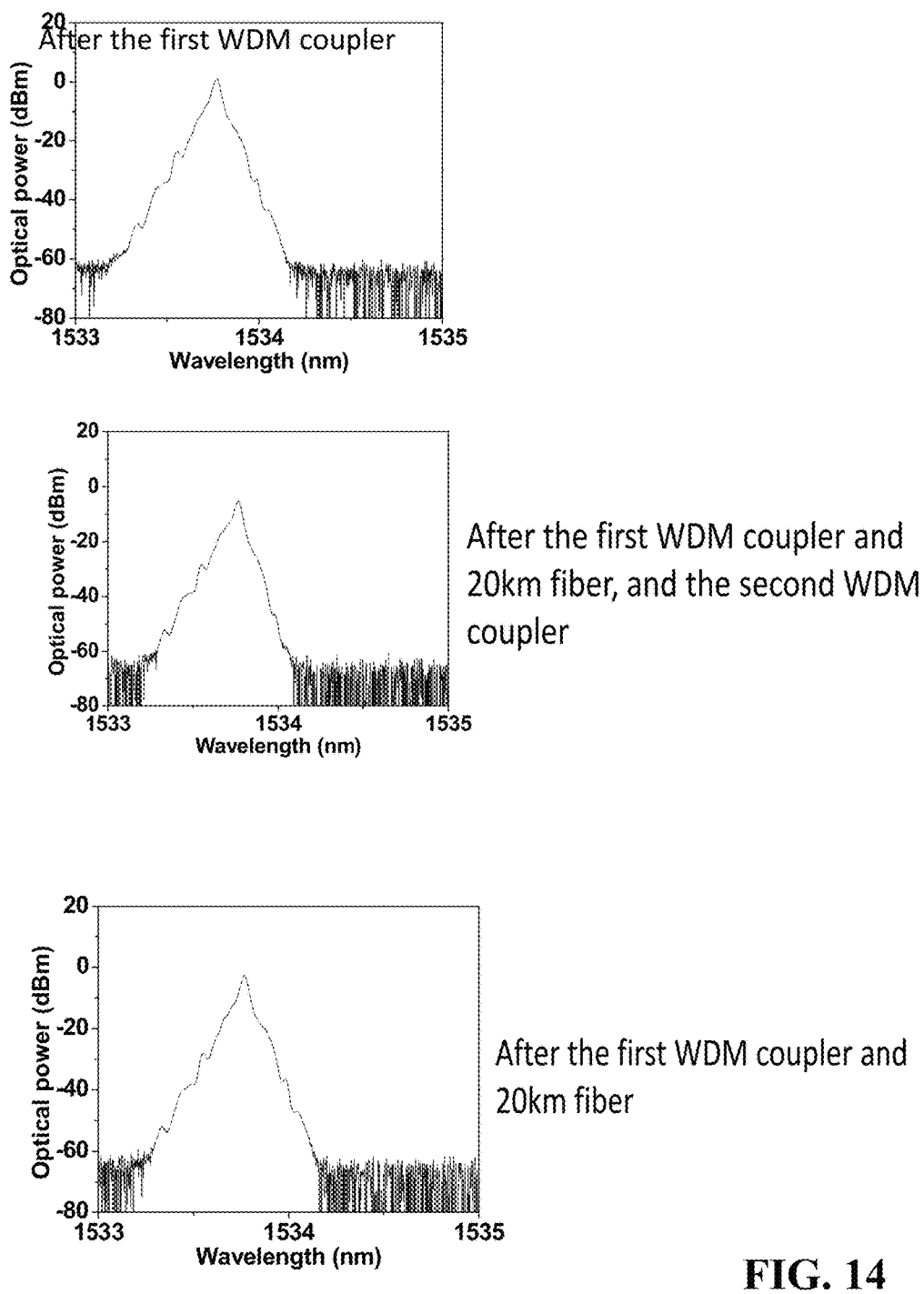
FIG. 14 shows optical spectra of an example 28 Gb/s embodiment.

Optical spectra of signals at different locations in the transmission system are shown in FIG. 14. We put 10-50 km SMF-28 with one insertion loss of 0.2 dB/km and GVD of 17 ps/nm/km between the two WDM couplers. At the receiver, one 18 GHz optical receiver is used to realize O/E conversion before BER test. One optical attenuator is added before optical receiver for optical power change. After the first WDM coupler and the second WDM coupler, the measured optical power is 8.4 and 5.4 dBm, respectively. The top graph shows the optical spectrum after the first WDM coupler. The middle graph shows the optical spectrum after the first WDM coupler and 20 km fiber and the second WDM coupler. The bottom graph shows the optical spectrum after the first WDM coupler and 20 km fiber.

Figure 15:
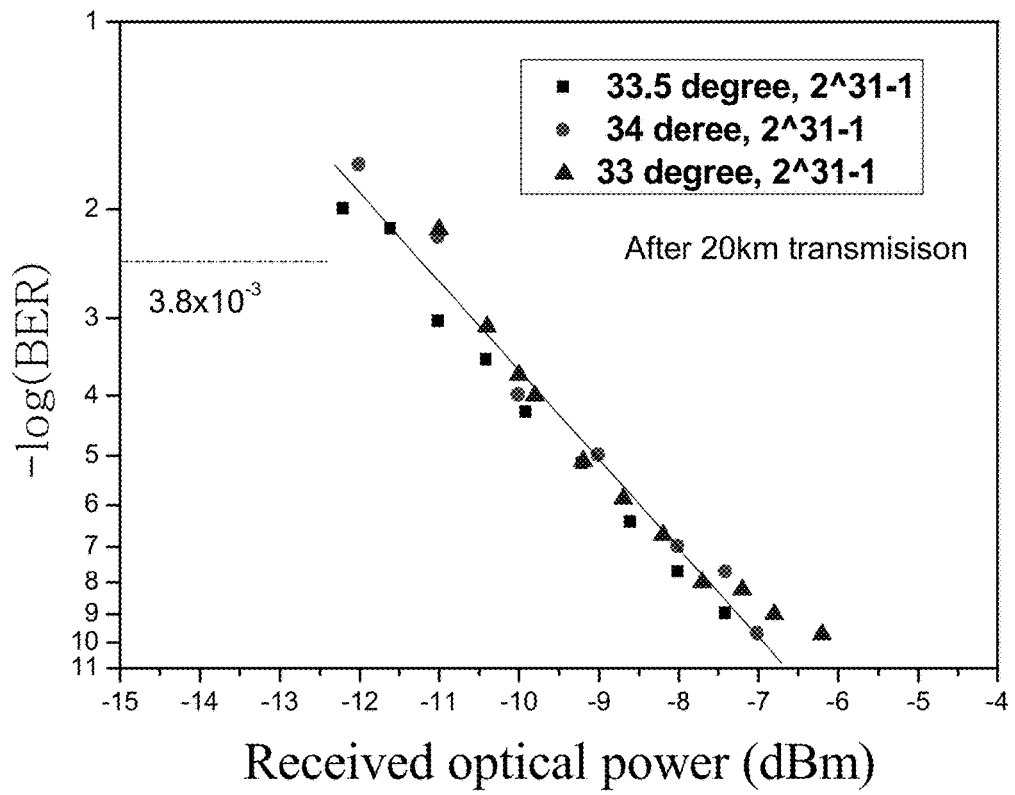
FIG. 15 shows received optical power as a function of temperature in an example embodiment.

FIG. 15 shows BER curve at different temperatures. FIG. 15 shows wavelength tolerance of an example embodiment. +/−6 GHz has not much difference, showing that the use of gentle filters thus provides a robust implementation that can sustain temperature variations.

Figure 16:
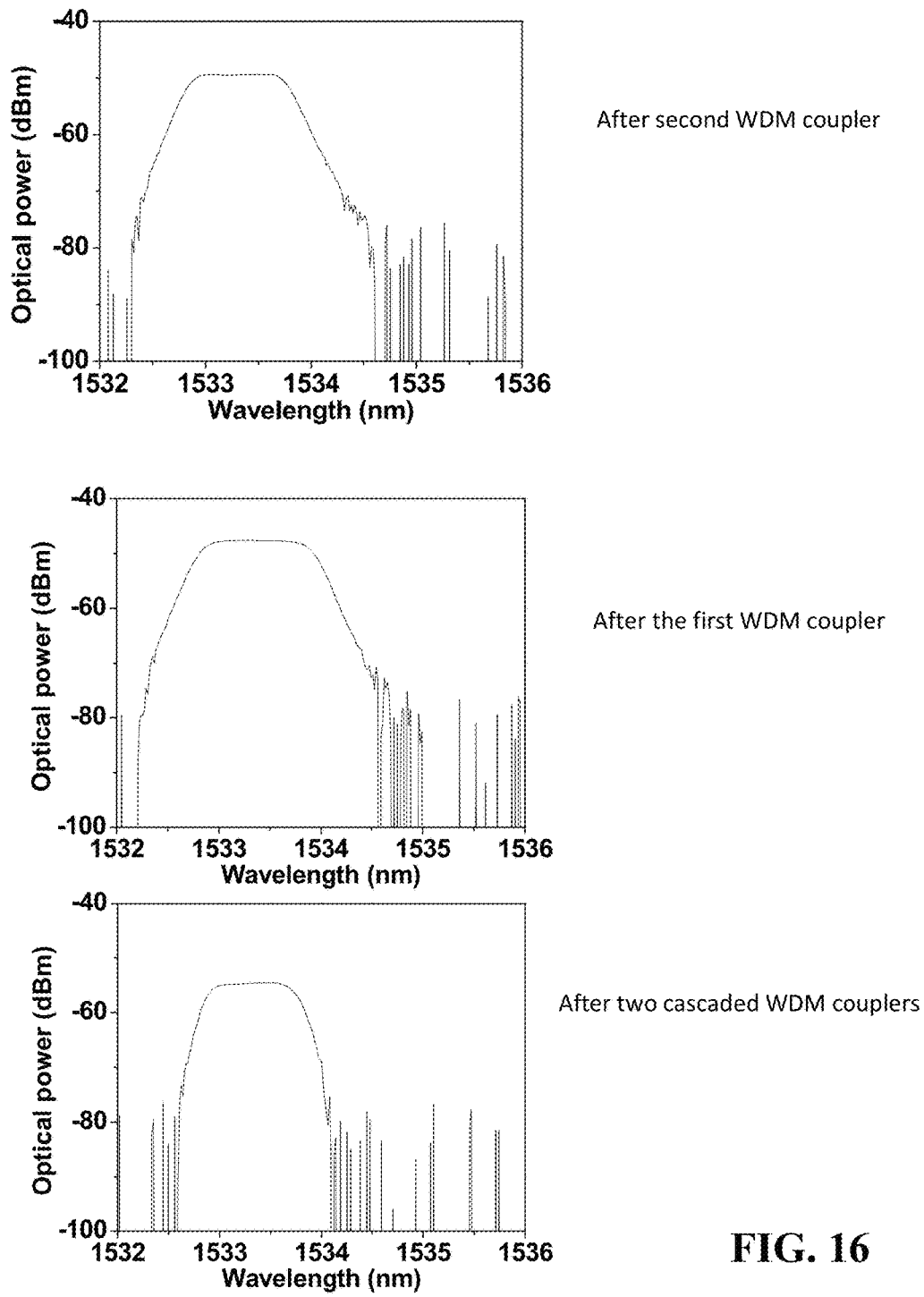
FIG. 16 shows example optical spectra after WDM coupler.

FIG. 16 shows example optical spectra after the WDM coupler in a two-coupler system implementation. The top graph shows optical spectrum after the second WDM coupler. The middle graph shows optical spectrum after the first WDM coupler. The bottom graph shows the optical spectrum after two cascaded WDM couplers.

Figure 17:
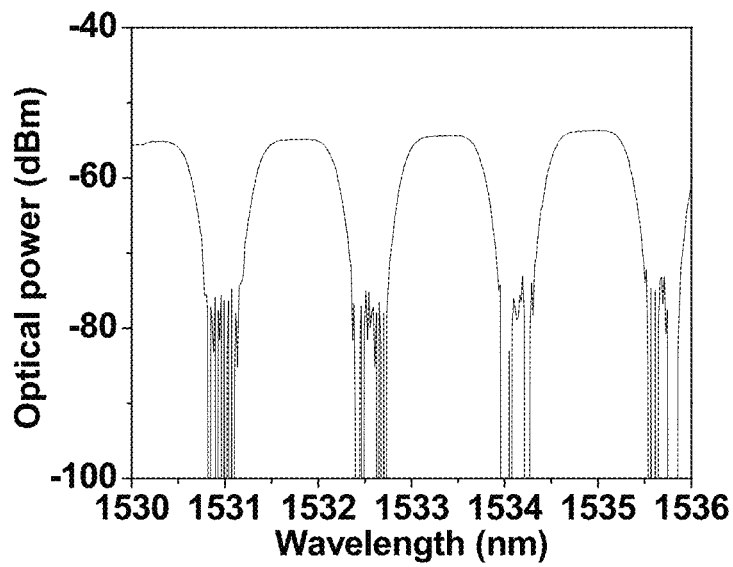
FIG. 17 shows examples of optical spectra after optical interleaver.
Figure 17:
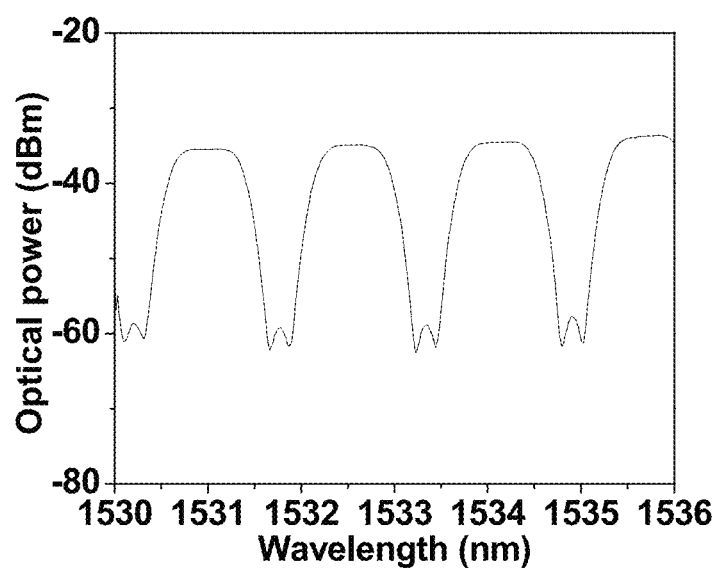

FIG. 17 shows examples of optical spectra after the optical interleaver.

Figure 18:
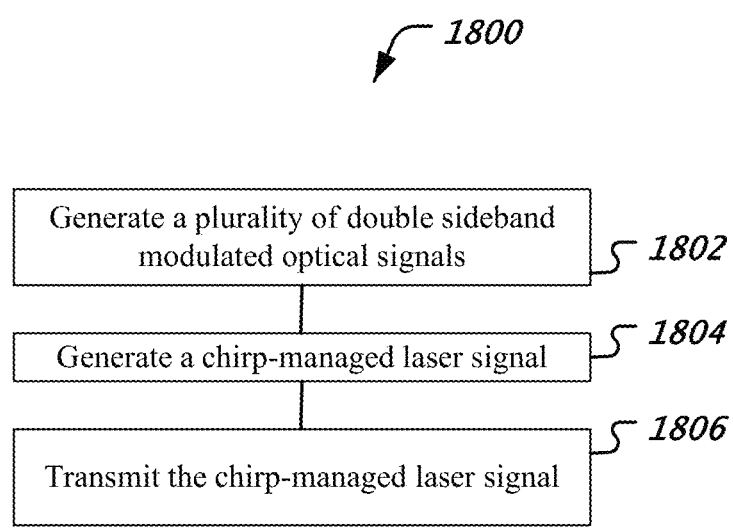
FIG. 18 is a flowchart of an example method of optical transmission.

FIG. 18 is a flowchart representation of a method 1800 of optical transmission, implemented by transmission circuitry of an optical apparatus.

The method 1800 includes, at 1802, generating a plurality of double sideband modulated optical signals by modulating a plurality of source data signals using a plurality of direct modulation laser (DML) optical sources, wherein the plurality of double sideband modulated optical signals occupy non-overlapping neighboring optical frequency bands. As previously disclosed, the DML sources may be biased at a high bias point such as 4× to 10×DC bias than the normal bias point.

The method 1800 includes, at 1804, generating a chirp-managed laser (CML) output signal by multiplexing the plurality of double sideband modulated optical signals using a wavelength-selective multiplexer. In some embodiments, the signal output of the wavelength-selective multiplexer may be evaluated to check whether it meets a pre-determined performance criteria for transmission, such as a target extinction ratio or receiver sensitivity. If not, a second wavelength-selective multiplexer stage may be used to achieve additional filtering.

The method 1800 includes, at 1806, transmitting the CML output signal over an optical transport medium.

As described herein, in various embodiments, the wavelength-selective multiplexer comprises a wavelength division multiplexing coupler or an arrayed waveguide grating.

In some embodiments, an optical communication method, implemented at a transmitter may include generating a first plurality of double sideband modulated optical signals by modulating a first plurality of source data signals using a first plurality of direct modulation laser (DML) optical sources, wherein the first plurality of double sideband modulated optical signals occupy non-overlapping odd-numbered optical transmission channels, generating a first intermediate optical signal by multiplexing the first plurality of double sideband modulated optical signals using a wavelength division multiplexing coupler, generating a second plurality of double sideband modulated optical signals by modulating a second plurality of source data signals using a second plurality of direct modulation laser (DML) optical sources, wherein the second plurality of double sideband modulated optical signals occupy non-overlapping even-numbered optical transmission channels, generating a second intermediate optical signal by multiplexing the second plurality of double sideband modulated optical signals using a wavelength division multiplexing coupler, generating a chirp-managed laser (CML) output signal by interleaving the first intermediate optical signal and the second intermediate optical signal using an optical interleaver, and transmitting the CML output signal over an optical transport medium.

Some disclosed embodiments relate to an optical transmission equipment. The apparatus includes a plurality of direct modulated laser (DML) sources each having data input and output ports and producing a plurality of double sideband modulated optical signals on a plurality of optical communication channels, a wavelength-selective multiplexer having a plurality of input ports, which generate a chirp-managed laser (CML) signal based on the plurality of double sideband modulated optical signals, and an output port at which the generated chirp-managed laser (CML) signal is output, and transmission circuitry having an input port coupled to the output port of the wavelength-selective multiplexer and an output port coupled to an optical transmission medium for transmitting an optical signal generated from the CML signal. In an embodiment, the plurality of DML sources may be divided into two or more groups, and each group of DML source may be assigned to a wavelength-selective multiplexer. Here, an interleaver may combine signals originating from the two or more groups of DML. The interleaver may convert the plurality of double sideband modulated optical signals into a plurality of single sideband signals, and may also reshape optical spectra of the signals.

Some disclosed embodiments may comprise an optical transmission method. The method includes generating a first plurality of double sideband modulated optical signals by modulating a first plurality of source data signals using a first plurality of direct modulation laser (DML) optical sources, wherein the first plurality of double sideband modulated optical signals occupy non-overlapping odd-numbered optical transmission channels, generating a first intermediate optical signal by multiplexing the first plurality of double sideband modulated optical signals using a wavelength division multiplexing coupler, generating a second plurality of double sideband modulated optical signals by modulating a second plurality of source data signals using a second plurality of direct modulation laser (DML) optical sources, wherein the second plurality of double sideband modulated optical signals occupy non-overlapping even-numbered optical transmission channels, generating a second intermediate optical signal by multiplexing the second plurality of double sideband modulated optical signals using a wavelength division multiplexing coupler, generating a chirp-managed laser (CML) output signal by interleaving the first intermediate optical signal and the second intermediate optical signal using an optical interleaver, and transmitting the CML output signal over an optical transport medium.

Some disclosed embodiments may include a receiver-side optical communication method. The method includes receiving an optical signal comprising modulated information bits carried over a plurality of multiplexed optical channels, demultiplexing the optical signal using a wavelength-selective demultiplexer to separate out optical signals from the plurality of multiplexed optical channels, wherein each of the separated signal comprises a double sideband modulated optical signal, and demodulating the double sideband modulated optical signals to recover the information bits.

Some disclosed embodiments may be implemented as an optical receiver. The apparatus includes an optical front end that receives an optical signal comprising modulated information bits carried over a plurality of multiplexed optical channels, a wavelength-selective demultiplexer having an input port and a plurality of output ports, the input port being coupled to an output of the optical front end, the wavelength-selective demultiplexer demultiplexing the optical signal to separate out optical signals from the plurality of multiplexed optical channels, wherein each of the separated signal comprises a double sideband modulated optical signal, and a plurality of optical demodulators coupled to the plurality of output ports of the wavelength-selective demultiplexer and demodulating a double sideband modulated optical signals to recover the information bits.

It will be appreciated that techniques for CML-based signal transmission/reception are disclosed without a need to use optical filters whose frequency responses match channel bandwidths, but simply by relying on filtering characteristics of wavelength-selective off-the-shelf equipment such as a WDM or an AWG.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:

generating a plurality of double sideband modulated optical signals by modulating a plurality of source data signals using a plurality of direct modulation laser (DML) optical sources, wherein the plurality of double sideband modulated optical signals occupy non-overlapping neighboring optical frequency bands;

generating a chirp-managed laser (CML) output signal by multiplexing the plurality of double sideband modulated optical signals using a wavelength-selective multiplexer; and transmitting the CML output signal over an optical transport medium, wherein each of the plurality of double sideband modulated optical signals is converted to a single sideband signal by the wavelength-selective multiplexer.

2. The method of claim 1, wherein the wavelength-selective multiplexer comprises a wavelength division multiplexing coupler.

3. The method of claim 1, wherein the wavelength-selective multiplexer comprises an arrayed wavelength guide (AWG).

4. An optical transmission apparatus, comprising:

a plurality of direct modulated laser (DML) sources each having data input and output ports and configured to generate a plurality of double sideband modulated optical signals on the output ports;

a wavelength-selective multiplexer having a plurality of input ports, configured to generate a chirp-managed laser (CML) signal based on the plurality of double sideband modulated optical signals at the input ports, and an output port at which the generated CML signal is output; and transmission circuitry having an input port coupled to the output port of the wavelength-selective multiplexer and an output port coupled to an optical transmission medium, the transmission circuitry configured for transmitting an optical signal generated from the CML signal, wherein each of the plurality of double sideband modulated optical signals is converted to a single sideband signal by the wavelength-selective multiplexer.

5. The apparatus of claim 4, wherein the wavelength-selective multiplexer comprises a wavelength division multiplexing coupler.

6. The apparatus of claim 4, wherein the wavelength-selective multiplexer comprises an arrayed wavelength guide (AWG).

7. The apparatus of claim 4, wherein the plurality of DML sources are divided into two or more groups, and each group of DML source is assigned to a wavelength-selective multiplexer.

8. The apparatus of claim 7, further comprising an interleaver combining signals originating from the two or more groups of DML.

9. The apparatus of claim 8, wherein the interleaver converts the plurality of double sideband modulated optical signals into a plurality of single sideband signals.

10. The apparatus of claim 8, wherein the interleaver reshapes optical spectra of the signals.

11. A method of optical communication, implemented at a transmitter in an optical communication network, comprising:

generating a first plurality of double sideband modulated optical signals by modulating a first plurality of source data signals using a first plurality of direct modulation laser (DML) optical sources, wherein the first plurality of double sideband modulated optical signals occupy non-overlapping odd-numbered optical transmission channels;

generating a first intermediate optical signal by multiplexing the first plurality of double sideband modulated optical signals using a wavelength division multiplexing coupler;

generating a second plurality of double sideband modulated optical signals by modulating a second plurality of source data signals using a second plurality of direct modulation laser (DML) optical sources, wherein the second plurality of double sideband modulated optical signals occupy non-overlapping even-numbered optical transmission channels;

generating a second intermediate optical signal by multiplexing the second plurality of double sideband modulated optical signals using a wavelength division multiplexing coupler;

generating a chirp-managed laser (CML) output signal by interleaving the first intermediate optical signal and the second intermediate optical signal using an optical interleaver; and transmitting the CML output signal over an optical transport medium, wherein each of the first and second intermediate optical signals is a double sideband signal and is converted to a single sideband signal by the optical interleaver.

12. The method of claim 11, wherein the step of generating the CML output signal is performed using only filtering attenuation from the wavelength division multiplexing coupler, exclusive of any other optical filter.

13. A method of optical communication, implemented at a receiver in an optical communication network, comprising:

receiving a single sideband optical signal comprising modulated information bits carried over a plurality of multiplexed optical channels;

demultiplexing the optical signal using a wavelength-selective demultiplexer to separate out single sideband optical signals from the plurality of multiplexed optical channels to reshape the single sideband optical signals and generate a chirp-managed laser (CML) signal; and demodulating modulated optical signals to recover the information bits.

14. The method of claim 13, wherein the wavelength-selective multiplexer comprises a wavelength division multiplexing coupler.

15. The method of claim 13, wherein the wavelength-selective multiplexer comprises an arrayed waveguide grating (AWG).

16. The method of claim 13, wherein the step of demultiplexing the optical signal is performed using only filtering attenuation from the wavelength-selective demultiplexer, exclusive of any other optical filter.

17. An apparatus for optical communication, comprising:

an optical front end that receives an optical signal comprising modulated information bits carried over a plurality of multiplexed optical channels;

a wavelength-selective demultiplexer having an input port and a plurality of output ports, the input port being coupled to an output of the optical front end, the wavelength-selective demultiplexer demultiplexing the optical signal to separate out single sideband optical signals from the plurality of multiplexed optical channels to reshape the single sideband optical signals and generate a chirp-managed laser (CML) signal; and a plurality of optical demodulators coupled to the plurality of output ports of the wavelength-selective demultiplexer and demodulating modulated optical signals to recover the information bits.

18. The apparatus of claim 17, wherein the wavelength-selective multiplexer comprises a wavelength division multiplexing coupler.

19. The apparatus of claim 17, wherein the wavelength-selective multiplexer comprises an arrayed waveguide grating (AWG).

20. The apparatus of claim 17, wherein the information bit recovery from the optical signal is exclusive of any other optical filter.

* * * * *